(12) United States Patent
Rakshani et al.

(10) Patent No.: US 7,254,495 B2
(45) Date of Patent: *Aug. 7, 2007

(54) SYSTEM AND METHOD FOR DETECTING A DEVICE REQUIRING POWER

(75) Inventors: Vafa Rakshani, Laguna Beach, CA (US); Nariman Yousefi, Monarch Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,529

(22) Filed: Aug. 16, 2005

(65) Prior Publication Data

US 2006/0034376 A1   Feb. 16, 2006

Related U.S. Application Data

(60) Continuation of application No. 10/124,676, filed on Apr. 17, 2002, now Pat. No. 6,954,708, which is a division of application No. 09/487,738, filed on Jan. 19, 2000, now Pat. No. 6,571,181.

(60) Provisional application No. 60/148,363, filed on Aug. 11, 1999.

(51) Int. Cl.
*G01R 21/00* (2006.01)

(52) U.S. Cl. ............... 702/60; 702/62; 702/188

(58) Field of Classification Search ........... 702/188, 702/60, 62; 370/257
See application file for complete search history.

(56) References Cited

U.S. PATENT DOCUMENTS

| | | | |
|---|---|---|---|
| 4,041,381 A | * | 8/1977 | Hwa ............... 324/533 |
| 4,686,696 A | | 8/1987 | Lynch |
| 5,390,197 A | * | 2/1995 | MacDonald et al. ........ 714/782 |
| 5,406,260 A | | 4/1995 | Cummings et al. |
| 5,410,754 A | * | 4/1995 | Klotzbach et al. ......... 370/466 |
| 5,416,623 A | * | 5/1995 | Dawson et al. ............ 398/33 |
| 5,432,946 A | | 7/1995 | Allard et al. |
| 5,608,792 A | * | 3/1997 | Laidler ............... 379/386 |

(Continued)

FOREIGN PATENT DOCUMENTS

GB   2325119 A   11/1998

(Continued)

OTHER PUBLICATIONS

Fausti et al, "Remote Powered Data Transmission System", Firenze, IEEE, USA, vol. Conf. 11, pp. 16.3 1-05 (Oct. 15, 1989).

*Primary Examiner*—Marc S. Huff
*Assistant Examiner*—Janet L Suglo
(74) *Attorney, Agent, or Firm*—McAndrews, Held & Malloy, Ltd.

(57) ABSTRACT

A system and technique for detecting a device that requires power is implemented with a power detection station. The power detection system includes a detector having an output and a return which are coupled together by the device when the device requires power. The detector includes a word generator for generating test pulses for transmission to the device via the detector output, and a comparator for comparing the detector output with the detector return. The power detection station has a wide variety of applications, including by way of example, a switch or hub.

9 Claims, 8 Drawing Sheets

U.S. PATENT DOCUMENTS

| | | |
|---|---|---|
| 5,657,257 A | 8/1997 | Lee |
| 5,764,694 A * | 6/1998 | Rahamim et al. ........... 375/224 |
| 5,796,965 A | 8/1998 | Choi et al. |
| 5,802,169 A * | 9/1998 | Frantz et al. ................ 379/398 |
| 6,049,885 A | 4/2000 | Gibson et al. |
| 6,085,328 A | 7/2000 | Klein et al. |
| 6,272,645 B1 | 8/2001 | Wang |
| 6,310,953 B1 * | 10/2001 | Yoshida et al. ........ 379/399.01 |
| 6,339,792 B1 | 1/2002 | Allison et al. |
| 6,954,708 B2 * | 10/2005 | Rakshani et al. ............. 702/79 |

FOREIGN PATENT DOCUMENTS

JP        07302141 A      11/1995

\* cited by examiner

SYSTEM AND METHOD FOR DETECTING A DEVICE REQUIRING POWER

CROSS-REFERENCE TO RELATED APPLICATIONS

This present application is a continuation of U.S. patent application Ser. No 10/124,676, filed Apr. 17, 2002 now U.S. Pat. No. 6,954,708, which is a divisional of U.S. patent application Ser. No 09/487,738, filed Jan. 19, 2000 now U.S. Pat. No. 6,571,181, entitled "System and Method for Detecting a Device Requiring Power," which claims priority under 35 U.S.C. § 119(e) to U.S. Provisional Application 60/148,363, filed Aug. 11, 1999, the contents of which are hereby expressly incorporated herein by reference as though set forth in full.

FIELD OF THE INVENTION

The present invention relates generally to telecommunications systems, and more particularly, to systems and techniques for detecting a device that requires power.

BACKGROUND OF THE INVENTION

Data terminal equipment (DTE) devices are well known. Examples of DTE devices include any kind of computer, such as notebooks, servers, and laptops; smart VCRs, refrigerators, or any household equipment that could become a smart device; IP telephones, fax machines, modems, televisions, stereos, hand-held devices, or any other conventional equipment requiring power. Heretofore, DTE devices have generally required external power from an AC power source. This methodology suffers from a number of drawbacks including interoperability during power shortages or failure of the external power source. Accordingly, it would be desirable to implement a system where the DTE power is drawn directly from the transmission line. This approach, however, would require a technique for detecting whether a DTE is connected to the transmission line and whether the DTE requires power.

SUMMARY OF THE INVENTION

In one aspect of the present invention, a power detection system includes a detector having an output and a return, and a device to selectively couple the detector output to the detector return when the device requires power.

In another aspect of the present invention, a detector having an output and a return includes a word generator coupled to the detector output, and a comparator to compare the detector output with the detector return.

In yet another aspect of the present invention, a method for detecting a device requiring power includes transmitting a pulse to the device, receiving the pulse from the device, and detecting whether the device requires power in response to the received pulse.

In yet still another aspect of the present invention, a transmission system includes a transmission line interface having at least one port, a two-way transmission line coupled to one of the ports, and a device coupled to the differential transmission line, the device selectively coupling the two-way transmission line together when the device requires power.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

In accordance with a preferred embodiment of the present invention, a detector is utilized to detect the presence of device on a transmission line and whether the device requires power. The device can be data terminal equipment (DTE) or any other device that may require power. Exemplary DTE equipment includes any kind of computer, such as notebooks, servers, and laptops; smart VCRs, refrigerators, or any household equipment that could become a smart device; IP telephones, fax machines, modems, televisions, stereos, hand-held devices, or any other conventional equipment requiring power. If the presence of a DTE requiring power is detected, then the detector can supply power to the DTE.

The described embodiment has broad applications. For example, a number of areas can benefit from power delivery over a transmission line including IP Telephony, Web Cameras, Wireless Access Points, Industrial Automation, Home Automation, Security Access Control and Monitoring Systems, Point of Sale Terminals, Lighting Control, Gaming and Entertainment Equipment, Building Management, and any other area where power is required.

Figure 1:
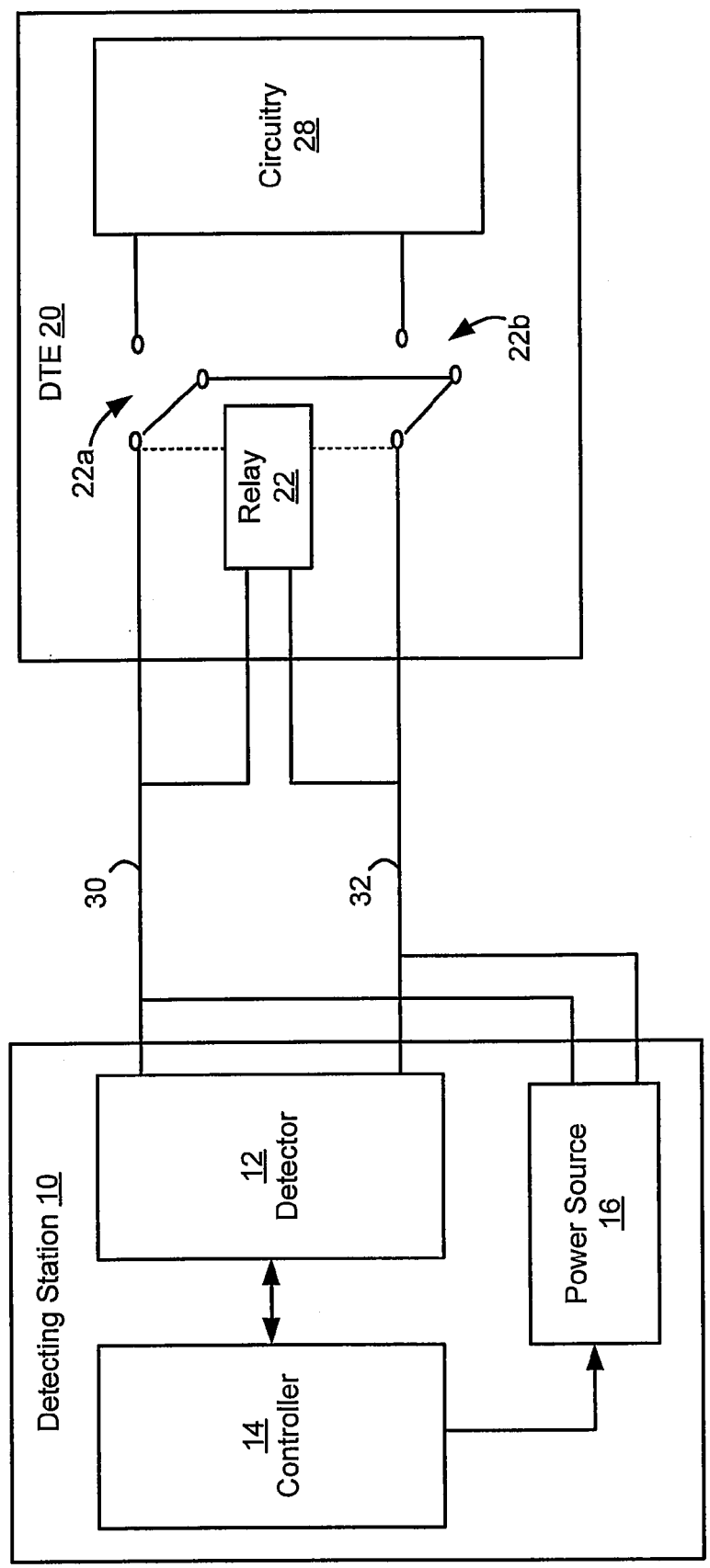
FIG. 1 shows an exemplary embodiment of the present invention with a detecting station connected to a DTE via a two-way transmission line.

An exemplary embodiment of the present invention is shown in FIG. 1 with a detecting station 10 connected to a DTE 20 via a two-way transmission line (detector output 30 and detector return 32). The detecting station includes a detector 12, a controller 14, and a power source 16. The detector 12 provides a direct interface to the DTE. The controller 14 initiates control and the detection process. In the preferred embodiment of the invention, the detector is a physical layer transceiver (PHY) with detecting capability. The controller 14 causes the detector 12 to detect whether the DTE 20 is connected to the transmission line and whether the DTE 20 requires power. If the Detector 12 determines that a DTE 20 requiring power is connected to the transmission line, it signals the controller 14. In response, the controller 14 activates the power source 16, thereby providing power to the DTE 20.

The DTE includes a relay 22 connected across the two-way transmission line 30, 32. The switches 22a, 22b are used to selectively connect the detector output 30 to the detector return 32 in the power requirement detection mode, and to connect the two-way transmission line 30, 32 to DTE circuitry 28 once power is applied to the DTE 20. Those skilled in the art will appreciate that other devices can be used to selectively connect the detector output 30 to the detector return 32 such as electronic switches and other conventional devices.

In operation, the detector 12 determines whether the connected DTE 20 requires power by sending test pulses to the DTE 20. In the default mode (power requirement detection mode), the relay 22 is de-energize causing the detector output 30 to be connected to the detector return 32 through the relay switches 22a, 22b. Thus, any test pulses sent from the detector 10 to the DTE 20 are looped back to the detector 12. The detector 12 determines that the DTE requires power if the test pulses are looped back from the DTE 20 to the detector 10. When the detector 12 determines that the DTE 20 requires power, it signals the controller 14. The controller 14 activates the power source 16, thereby delivering power over the two-way transmission line 30, 32. Once power is applied to the two-way transmission line 30, 32, the relay 22 is energized causing the relay switches 22a, 22b to connect the two-way transmission line 30, 32 to the DTE circuitry 28.

Figure 2:
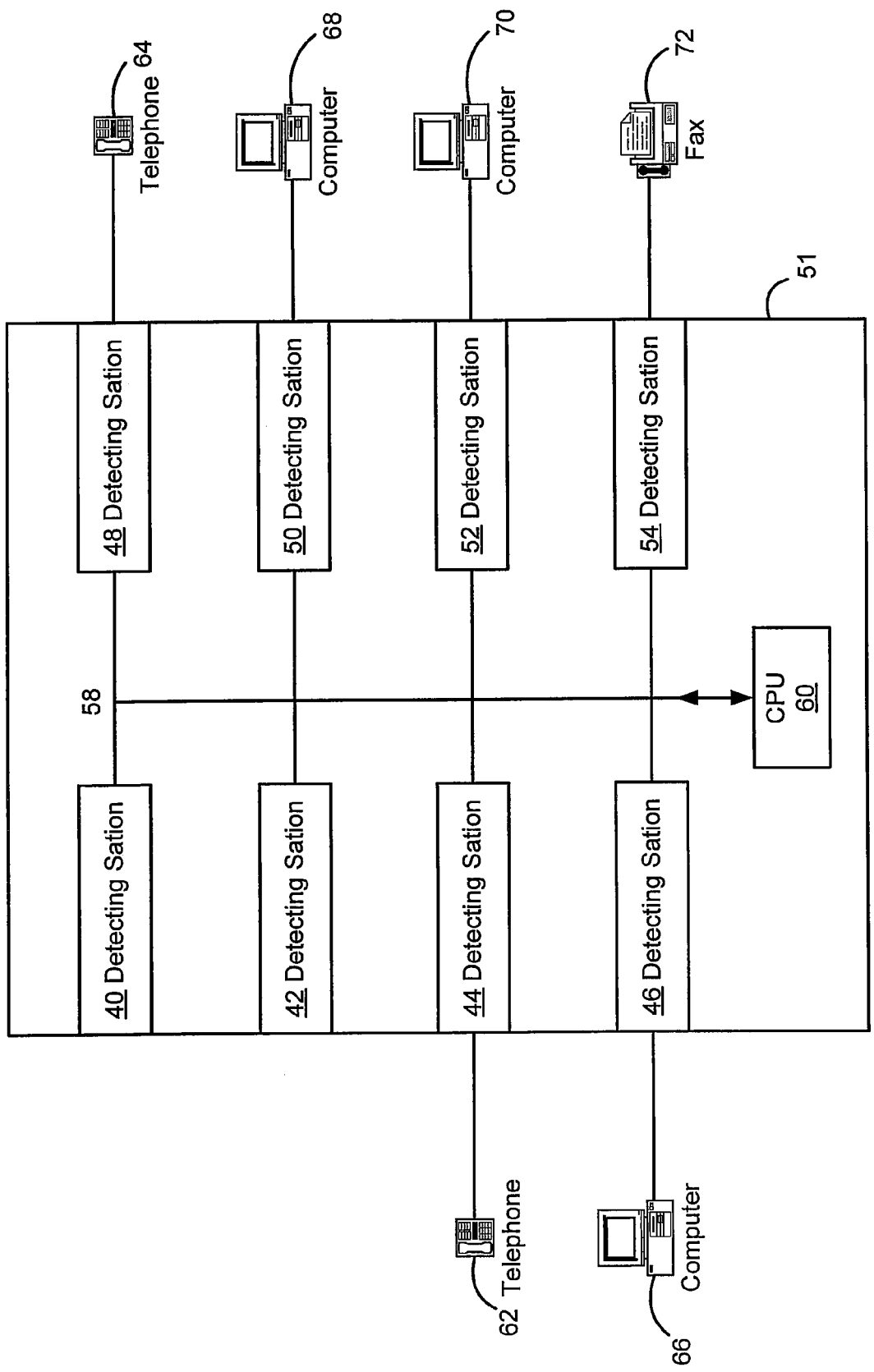
FIG. 2 shows an exemplary embodiment of this application with a Fast Ethernet switch having eight detecting stations.

The described embodiment of the detector has a wide range of application. For example, the detector could be integrated into a transmission line interface, such as a switch or hub, which links various DTEs onto a local area network (LAN). This application would provide a technique for detecting which DTEs, if any, connected to LAN require power, and providing power over the LAN to those DTE's that require it. FIG. 2 shows an exemplary embodiment of this application with a Fast Ethernet switch 51 having eight detecting stations 40, 42, 44, 46, 48, 50, 52, 54. Each detecting station includes a full-duplex 10/100BASE-TX/FX transceiver (not shown). Each transceiver performs all of the Physical layer interface functions for 10BASE-T Ethernet on CAT 3, 4 or 5 unshielded twisted pair (UTP) cable and 100BASE-TX Fast Ethernet on CAT 5 UTP cable. 100BASE-FX can be supported at the output of each detecting station through the use of external fiber-optic transceivers.

The detecting stations 40, 42, 44, 46, 48, 50, 52, 54 are connected to a data bus 58. A CPU 60 controls the communication between detecting stations by controlling which detecting stations have access to the data bus 58. Each detecting station has a detector that can be connected to a DTE. In the described embodiment, the detecting stations 40, 42 are not connected to any device. The detecting stations 44, 48 are connected to IP telephones 62, 64. The detecting stations 46, 50, 52 are connected to computers 66, 68, 70. The detecting station 54 is connected to a fax machine 72.

In the default mode, each detector of each detecting station sends test pulses to its respective device. Each detector would then wait to see if the test pulses from its respective DTE device is looped back. In the described embodiment, if the IP telephones 62, 64 are the only devices requiring power, then the test pulses will only be looped back to the detecting stations 44, 48. The detecting stations 44, 48 will then deliver power to their respective IP telephones over the transmission line. The computers 66, 68, 70 and the fax machine 72 do not require power, and therefore, will not loop back the test pulses to their respective detectors. As a result, the detecting stations 46, 50, 52, 54 will not deliver power over the transmission line.

Although the detector is described in the context of a Fast Ethernet switch, those skilled in the art will appreciate that the detector is likewise suitable for various other applications. Accordingly, the described exemplary application of the detector is by way of example only and not by way of limitation.

In the context of a Fast Ethernet switch, it is desirable to configure the detectors to prevent failures of DTE devices in the event that the system is wired incorrectly. For example, in the Fast Ethernet switch application shown in FIG. 2, one skilled in the art could readily recognize that the computer 68, which does not require power, could be inadvertently wired directly to the IP telephone 64. If the IP telephone 64 required power, a switch (see FIG. 1) would connect the two-way transmission line together in the default mode. As a result, the computer 68 would attempt to negotiate data rates with the IP telephone 64 on power up. The data rate negotiation in the described exemplary application is governed by IEEE 802.3u Clause-28 rules, the contents of which are expressly incorporated herein by reference as though set forth in full. This standard dictates an Auto-Negotiation methodology wherein Fast Link Pulses (FLP) having a 100 ns pulse width are transmitted between devices. Accordingly, the FLPs transmitted by the computer 68 would be looped back to the computer 68 through the relay contacts in the IP telephone 64 (see FIG. 1). The computer 68 would interpret these looped back FLPs as data from a device attempting to negotiate a data rate with it. The computer 68 would thus be unable to successfully negotiate a data rate and enter into a continuous loop.

Figure 3:
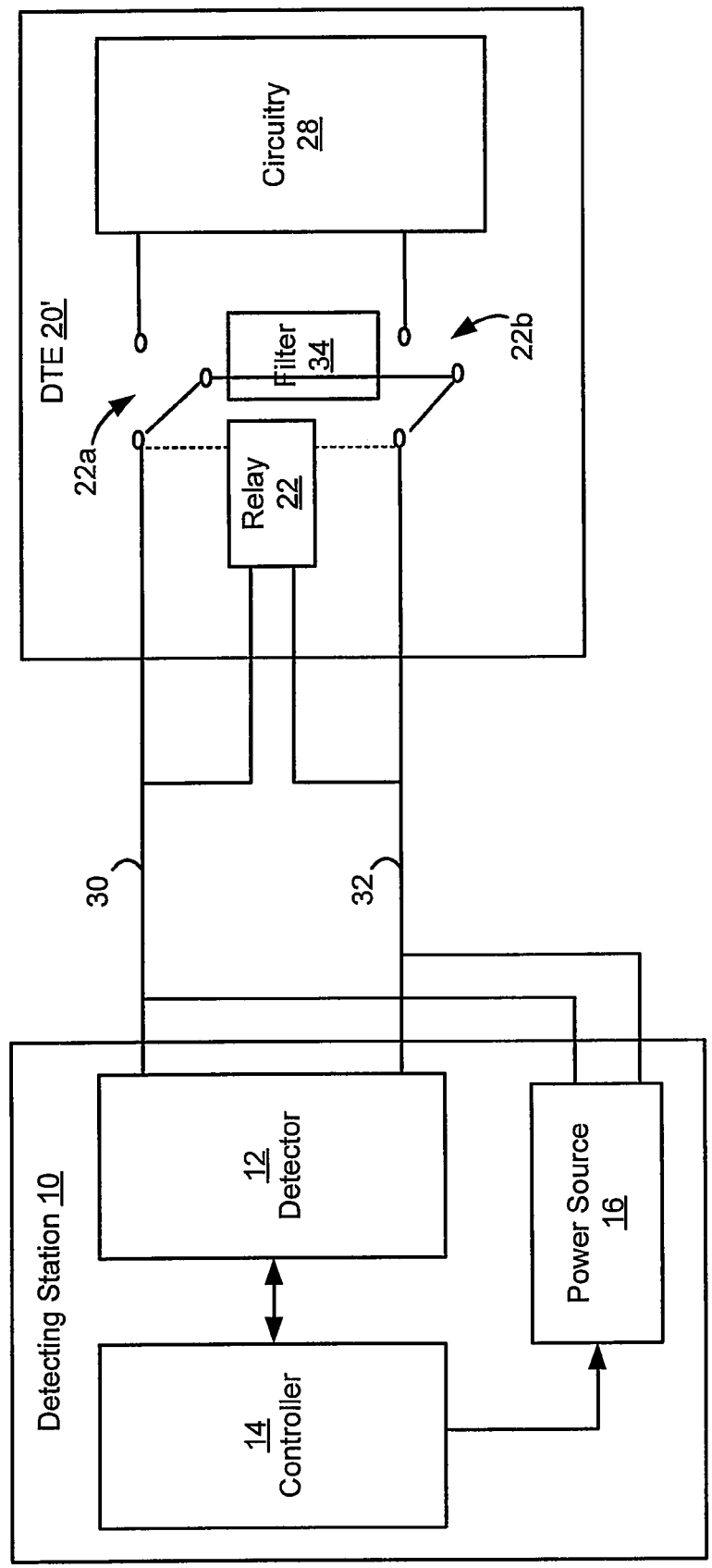
FIG. 3 shows a detecting station connected to a DTE, the DTE being modified to include a low-pass filter.

To avoid this potential problem, an exemplary embodiment of the present invention utilizes a filter in the front end of the DTE. Turning to FIG. 3, a detecting station 10 is shown connected to a DTE 20'. The detecting station 10 is identical to that described with reference to FIG. 1. However, the DTE 20' has been modified to include a low-pass filter 34 connected between the detector output 30 and the detector return 32 through the relay switches 22a, 22b when the relay 22 is de-energize. The cutoff frequency of the low-pass filter 34 is set to filter out the 100 ns FLPs. Thus, in this embodiment, the detector uses test pulses having pulse widths greater than 100 ns which will pass through the low-pass filter. With this approach, if the computer 68 (see FIG. 2) were inadvertently connected to the IP telephone 64, the 100 ns FLP's transmitted from the computer 68 to the IP telephone 64 would be filtered out by the low-pass filter 34 (see FIG. 3) thereby preventing the computer 68 from entering into a continuous loop. If the system were wired correctly, however, test pulses wide enough to pass the low-pass filter 34 would be looped backed through the DTE 20' to the detecting station 10 indicating a requirement for power.

In operation, the detector 10 determines whether the connected DTE 20' requires power by sending test pulses to the DTE 20'. Typically, a 150 ns wide pulse can be used, although those skilled in the art will readily appreciate that the filter can be designed to pass test pulses of any width. Preferably, the pulse width of the test pulses is programmable. The skilled artisan will also recognize that either a single test pulse or a series of test pulses can be used to detect DTEs requiring power. In the context of a Fast Ethernet switch, economy dictates that a 16 bit word conforming to the IEEE 802.3 standards is used. This standard is already supported in the detector 12 and controller 14, and therefore, lends way to easy integration of the tests pulses into the detector 10 without any significant increase in complexity.

In the default mode (power requirement detection mode), the relay 22 is de-energize causing the detector output 30 to be connected to the detector return 32 through the relay switches 22a, 22b. Thus, any test pulses sent from the detector 10 to the DTE 20' are looped back to the detector 10 through the filter 34. The detector 12 determines that the DTE requires power if the test pulses are looped back from the DTE 20' to the detector 10. When the detector 12 determines that the DTE 20' requires power, it signals the controller 12. The controller 12 activates the power source 16, thereby delivering power over the two-way transmission line 30, 32. Once power is applied to the two-way transmission line 30, 32, the relay 22 is energized causing the relay switches 22a, 22b to connect the two-way transmission line 30, 32 to the DTE circuitry 28.

The 16-bit word generated by the test pulses can be a pseudo random word in the described exemplary embodiment. This approach will significantly reduce the risk that two detectors in the Fast Ethernet switch inadvertently wired together will attempt to power one another. If this inadvertent miswiring were to occur, the chances that the detectors would generate the same 16 bit word such that it would appear at each detector as if their respective test pulses were being looped back is $1/2^{16}$. Alternatively, the 16 bit word could be an identifier such as a controller address. In other words, the address would be embedded into the 16 bit word.

As a result, if two detectors were inadvertently wired together, the exchange of test pulses between them would not be mistaken as a looped back condition because the controller address of each detectiing station is different.

To further reduce the risk of one detector mistaking another detector for a DTE, the detector could generate a narrow window in time when it expects to receive test pulsed back after transmission. Thus, unless the two detectors are sending test pulses at or near the same time, a looped back condition would not be detected. For example, using the IEEE 802.3 standard, a 16 bit word is transmitted every 8 ms minimum. If the window is set for the worst case round trip delay of each test pulse say 4 us, then the probability that the other detector would transmit its test pulses in the window is $1/2000$.

Further reliability can be achieved by sending two groups of test pulses. The first group of test pulses will have sufficiently wide pulse widths such that they pass through the filter of the DTE. The second group of test pulses will be FLPs of 100 ns width as specified in the IEEE 802.3u Clause-28 rules. As a result, only the first group of test pulses will be routed back to the detector. The detector detects the first group of pulses and signals the controller. In response, the controller enables the power source which delivers power to the two-way transmission line.

This approach is useful for detecting a short in the two-way transmission line. For example, if the detector output was shorted to the detector return, both the first and the second group of test pulses would be detected by the detector. This information would be signaled to the controller. The controller would process the results concluding that a short in the two-way transmission line has occurred since both the first and second group of test pulses were received. In response, the controller would not enable the power source.

Figure 4:
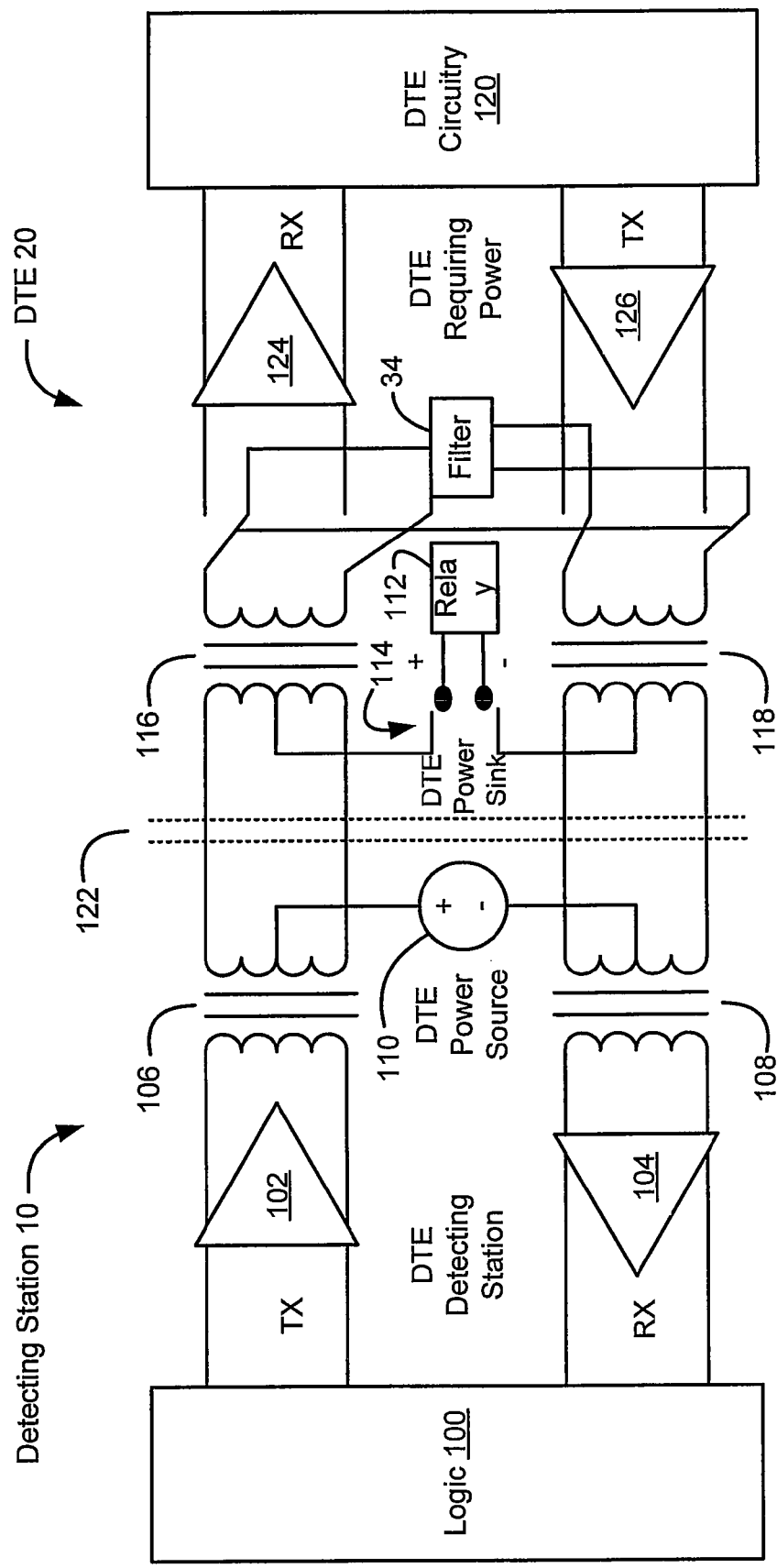
FIG. 4 shows a detecting station subsection and DTE requiring power.

FIG. 4 shows a detecting station 10 subsection and a DTE requiring power 20'. The detecting station includes logic 100, transmitter 102, receiver 104, a detector transmit transformer 106, a detector receive transformer 108, and a power source 110. The DTE includes DTE circuitry 120, a receiver 126, a transmitter 124, a DTE receive transformer 116, a DTE transmit transformer 118, a relay 112, and a filter 34.

Figure 5:
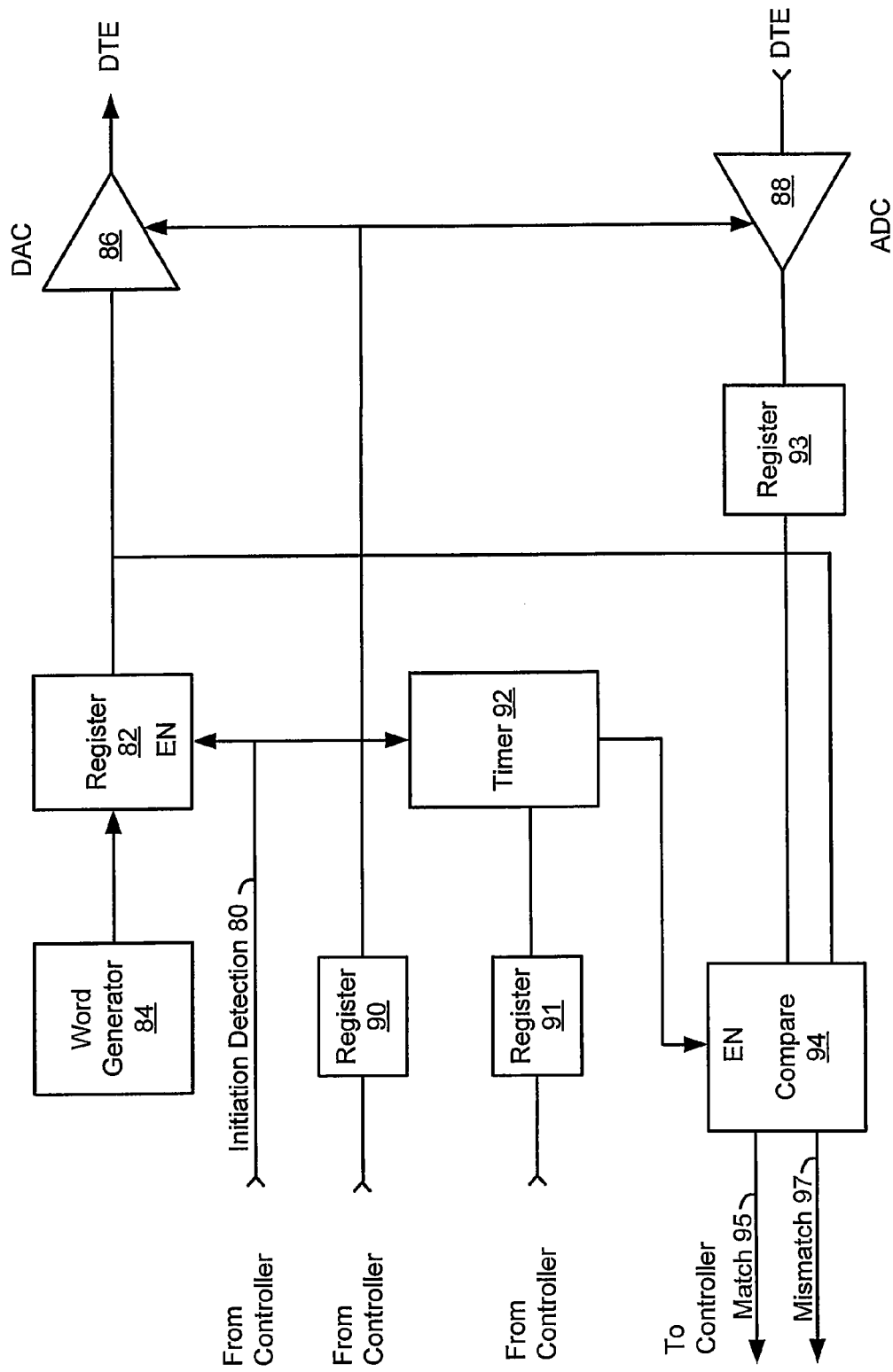
FIG. 5 shows the logic that generates the test pulses and compares the test pulses with the received pulses.

The test pulses are generated by the logic 100 and coupled to the transmitter 102. The output of the transmitter is coupled to the primary winding of the transmit transformer causing the test pulses to be induced into the secondary winding. The secondary winding of the transmit transformer is coupled to a DTE power source. The power source is isolated from the transmitter and receiver to protect their circuitry. The test pulses from the secondary winding of the transmitter are transmitted to the DTE. The wires between the detecting station and the DTE requiring power are shown in FIG. 5 between the dashed lines 122. The test pulses do not energize the relay 112 because the test pulses are AC. The test pulses transmitted to the secondary windings of the DTE transformer are indirect to the primary side of the DTE receive transformer 116.

In the absence of power in the DTE, the test pulses on transformers 116, 112 are directed through the low-pass filter 84. The primary winding of the DTE receive transformer 116 is coupled to the primary winding of the DTE transmit transformer 118 through a low-pass filter 34. The test pulses from the DTE receive transformer 116 are directed through filter 34 to the primary winding of the DTE transmit transformer 118. The test pulses are from the primary winding of the DTE transmit transformer are induced into the secondary winding of the DTE transmit transformer 118. The condition of the absence of the power on the DTE, the receive signal passing through the filter to the transmitter side of the DTE is referred to as the loopback condition. The induced test pulses from the secondary winding of the DTE transmit transformer sends pulses on the detector return line. The test pulses on the detector return are coupled to the secondary winding of the detector receive transformer 108, thereby inducing the test pulses into the primary winding of the receiver 104.

The logic 100 compares the test pulses sent with the test pulses received. If the test pulses match, then a DTE requiring power has been detected. Once the DTE requiring power is detected, the detector supplies power via the transmission line to the DTE requiring power. The power is directed from a power supply 110 of the detector to the detector output onto the transmission wires. The DTE power sink absorbs the power and the DC power activates the relay 112, thereby closing the switches from the transformers 116, 118 and connecting the detector with the DTE. The power connection to the DTE requiring power 20' is coming from the detector output of the transformer as opposed to the detector side of the DTE requiring power.

The power source may have a current limitation in order to prevent hazards in case of a cable short while the detector is powered. The transformers 106, 108, 116, 118 provide isolation between the detector 10 and the DTE requiring power 20'.

FIG. 5 shows the logic 100 that generates the test pulses and compares the test pulses with the received pulses. A word generator 84 is coupled to a register 82. The word generator 84 generates the test pulses which in the prescribed exemplary embodiment is a 16-bit word. In the preferred embodiment, the word generator 84 generates a pseudo-random code word. Alternatively, the word generator 84 is designed to generate a unique identifier, which can be a controller identifier. The uniqueness of the word generator output, also referred to as the unique code word, increases the probability of correctly detecting a DTE requiring power through the loopback connection. The controller initiates the detection mode by generating an Initiate Detection trigger 80, which causes the register 82 to latch the output of the word generator 84. The register 82 is coupled to a pulse shaping device such as a digital-to-analog converter (DAC) 86. The DAC is used to shape the pulse. In the preferred embodiment, the DAC generates a link pulse shape in accordance with IEEE 802.3u and IEEE 8802.3 The digital-to-analog converter (DAC) 86 converts the test pulses into analog signals for output to the DTE. The controller indicates the length of the test pulses by writing to register 90. Register 90 determines the length of the test pulses by being coupled to the DAC. In the preferred embodiment, in accordance with IEEE 802.3u and IEEE 8802.3, the typical test pulse is 100 ns wide. By programming register 90, the test pulse width can be widened, such as 20 us or more.

A signal detecting device such as an analog-to-digital converter (ADC) converts the DTE output analog signals to digital signals. The ADC is coupled to a register 93. The register 93 is coupled to a comparator 94 and latches the ADC output for use by the comparator 94.

The window time period is programmable. The controller programs the time window by writing to the programmable register 91. Register 91 determines the length of the time window by being coupled to timer 92. The timer 92 enables comparing 94 the sent test pulses with the received test pulses for the window time period. If the sent test pulses are the same as the received pulses and the received pulses within the window time, then the comparator indicates a match 95. If the received pulses are not the same as the sent pulses or are not received within the window time, then the comparator indicates a mismatch 97. The purpose of the window time period is to improve the probability of correctly matching sent test pulses with received test pulses and reduce the probability of mis-detecting another detector sending the same unique code word.

Figure 7:
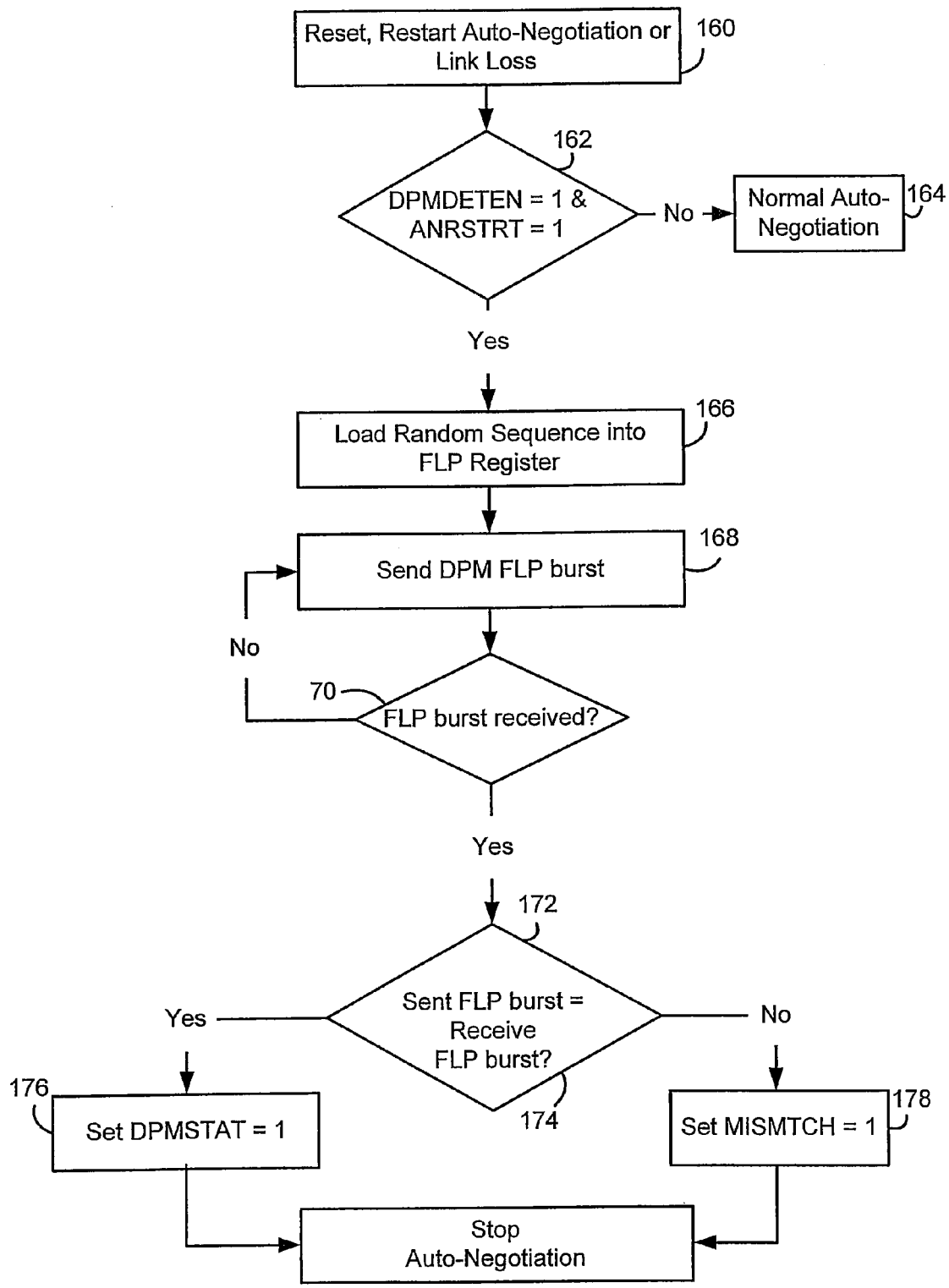
FIG. 7 shows the sequence for DPM detection combined with Auto-Negotiation in a basic embodiment of the invention.
Figure 8:
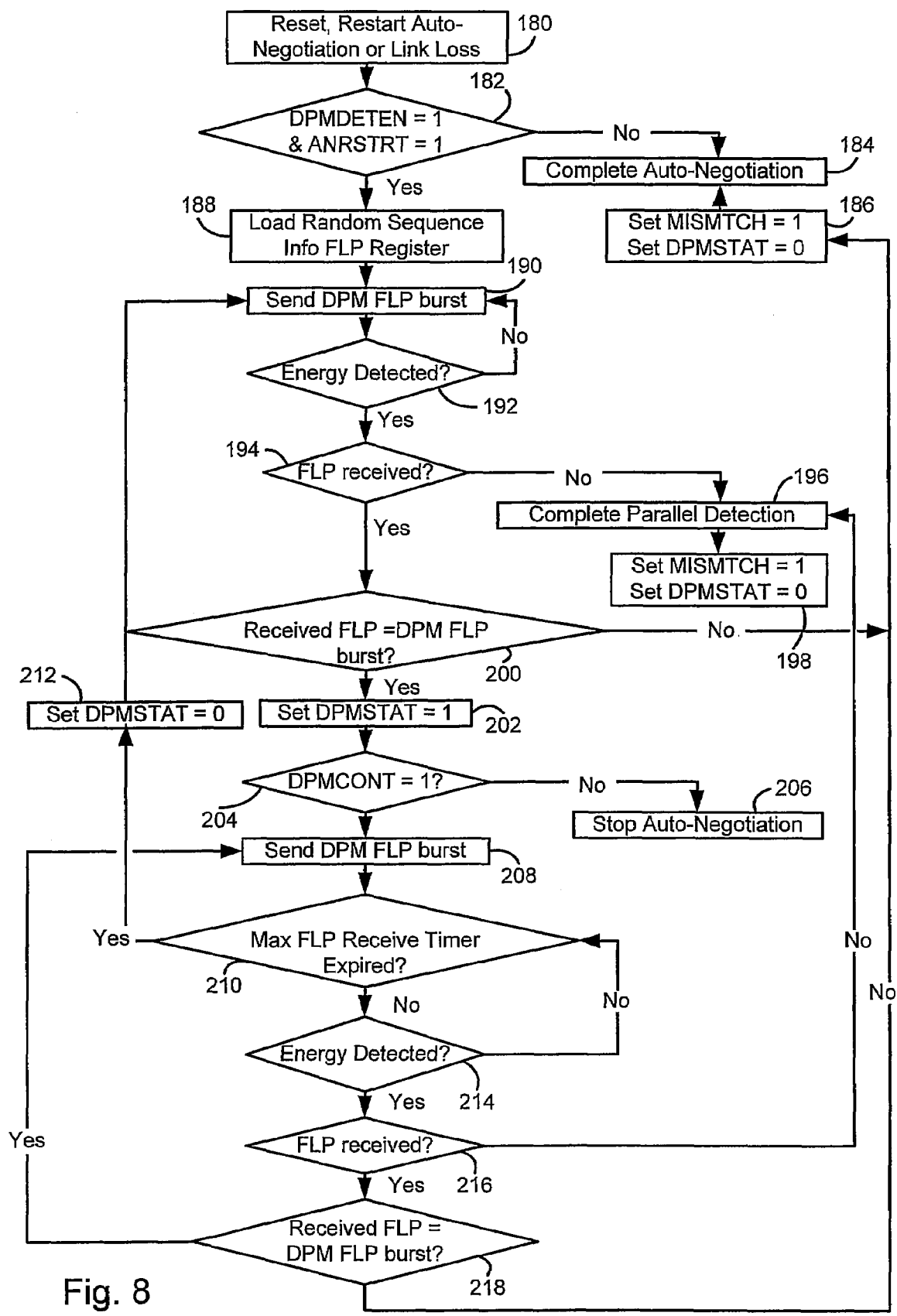
FIG. 8 is a flowchart that shows the sequence for DPM detection combined with Auto-Negotiation in a preferred embodiment of the invention.

The logic 100 is controlled via the flow/state diagram in FIGS. 7 and 8 for the basic and preferred embodiments, respectively. In the preferred embodiment, flow/state diagram is embedded within the IEEE standard 802.3u clause 28 auto-negotiation definition and inter-operates with all the devices designed to that standard.

In addition to configuring the detector to transmit two groups of test pulses, it is also desirable in certain embodiments of the present invention to implement the power source with current limiting capability in the event of a short circuit in the two-way transmission line.

Figure 6:
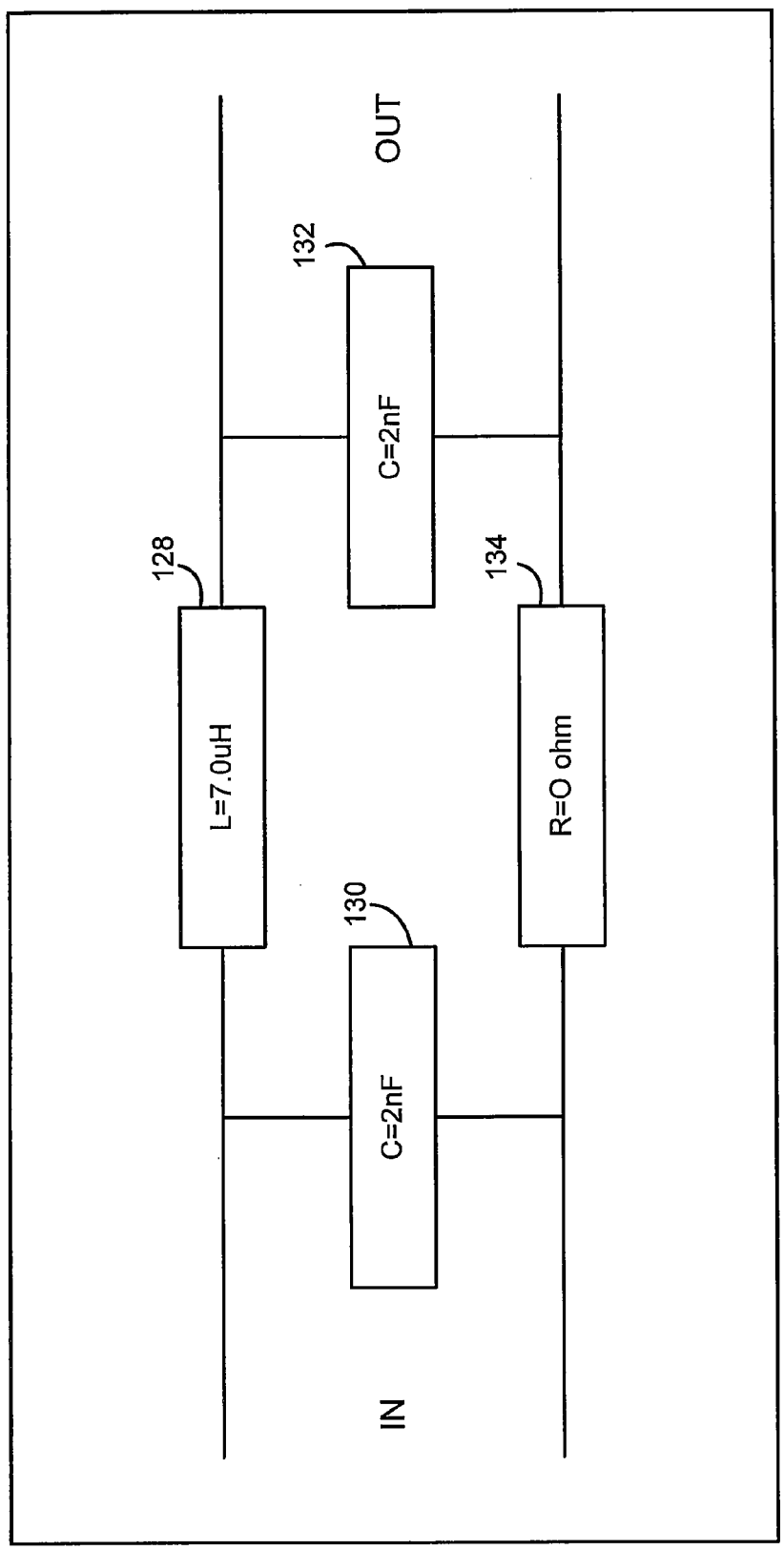
FIG. 6 shows an exemplary embodiment of the low-pass filter.

An exemplary embodiment of the low-pass filter is shown FIG. 6. The low-pass filter is a 3-pole filter with a cutoff frequency of 880 kHz. In the described exemplary embodiment, the low pass filter comprises a 7.0 uH inductor 128, two 2 nF capacitors connected in parallel 130, 132, and a zero ohm resistor 134. The zero ohm resistor is a placeholder to show that the values of the inductor, capacitors, and resistor can have different values, such that the cutoff frequency is 880 kHz. Alternatively, the low pass filter can have any cutoff frequency that passes low frequencies.

The detector provides support for identifying data terminal equipment capable of accepting power via media dependent interface. Such a DTE is typically connected to a Ethernet switch capable of detecting its presence and able to establish signaling with it. The process of identifying DTE power via MDI capable is termed DPM. The detector provides support for an internet-protocol based telephone, known as IP PHONE. The IP PHONE is one type of DTE.

The detector is capable of normal Auto-Negotiation, which is its default state, or a modified Auto-Negotiation when its DPM detection mode is enabled. The Auto-Negotiation scheme is embedded within the IEEE 802.3u Clause-28 rules. Therefore, the detector can be connected to either an IP PHONE or a non-IP PHONE without detriment to the detector operation.

When the detector starts Auto-Negotiation and DPM detection is enabled, it sends a unique Fast Link Pulse (FLP) word that is different from a formal FLP word. If the Link partner is DPM capable, it returns this unique FLP word. Otherwise, the detector may receive the Link partner's word instead of the unique FLP word sent. The detector updates a register containing relevant status bits that the controller (Control) can read. The detector continues to send the unique FLP word if no response is received from the Link partner. The controller, at any time, can disable DPM detection and restart Auto-Negotiation to establish normal link with the Link partner.

Upon power-up the detector defaults to normal mode, non-DPM detection mode, as per the IEEE 802.3u standard. The detector includes a shadow register, DPM, containing required 'enable' and 'status' bits for DPM support.

If the DPM detection mode is enabled, through modifications to the Auto-Negotiation algorithm, the detector sends a unique Fast Link Pulse (FLP) word that is different from a normal FLP word. If the Link partner is a DPM, this unique FLP word externally loops back to the device. Otherwise, the device may receive the Link partner's word instead of its own unique FLP word. The detector is capable of robustly determining if its partner is DTE type or not. Upon determination, the detector updates a register containing relevant status bits that the controller can read. The detector continues to send the unique FLP word if no response is received form a partner. The controller, at any time, can disable the DPM detection mode and restart the Auto-Negotiation to establish normal link with a Link partner.

FIG. 7 shows the sequence for DPM detection combined with Auto-Negotiation in a basic embodiment of the invention. Table 1 and 2 show DPM register bits and their description. DPM detection can be reset or restarted along with auto-negotiation or link loss 160. The controller can enable DPM detection by setting the DPMDETEN bit to a "1" and restart Auto-Negotiation by setting ANRSTRT bit to a "1" 162. If these bits are not set, then normal auto-negotiation proceeds 164. When the DPM detection mode is enabled, the device loads an internally generated unique (random) word into the Auto-Negotiation Advertisement register, also called an FLP register 166, and begins to transmit this FLP word 168. In the basic embodiment, while this word is transmitted, link pulses' width can be increased from a normal 100 ns to 150 ns if LPXTND bit is set to a "1". In the preferred embodiment, while this word is transmitted, the link pulse width can be increased from 150 ns to 950 ns, in 100 ns increment per FLPWIDTH register, if LPXTND bit is set to a "1". If LPXTND bit is a "0" then a default link pulse width of 100 ns is used. The wider link pulse enhances the cable reach for the DTE if the external loopback is over CAT 3 cabling.

In the basic embodiment, if the unique FLP word is not received from the Link partner, then the detector continues to send the DPM FLP burst 170. If the unique FLP word is received from the Link partner 172, then the detector checks if the sent FLP burst matches the received FLP burst 174. If they match, then the detector sets its DPMSTAT bit to a "1" 176. The received unique FLP word indicates a DPM detection. If it receives any other FLP word, the detector sets its MISMTCH bit to a "1" 178, indicating a non-DPM detection. After it sets either the DPMSTAT or MISMTCH bit, the detector stops auto-negotiation and waits in the TX-Disable state of the Auto-Negotiation arbitrator state machine. The controller polls the mutually exclusive DPM-STAT and MISMTCH bits, to determine if a partner is detected and if the partner is DPM capable. If the partner is a DPM capable, the power to the DTE is supplied through the UTP cable. After the partner has been identified through the DPMSTAT or MISMTCH bit, to establish link with the partner, the DPMDETEN bit should be disabled, and Auto-Negotiation process restarted.

In the preferred embodiment, DPM detection can be reset or restarted along with auto-negotiation or link loss 180. The controller can enable DPM detection by setting the DPMDETEN bit to a "1" and restart Auto-Negotiation by setting ANRSTRT bit to a "1" 182. If these bits are not set, then normal auto-negotiation proceeds 184 and the MISMTCH bit is set to "1" and the DPMSTAT bit is set to "0" 86. When the DPM detection mode is enabled, the device loads an internally generated unique (random) word into the Auto-Negotiation Advertisement register, also called an FLP register 188, and begins to transmit this DPM FLP word 190. In the preferred embodiment of the invention, the detector continues to send out an internally generated unique DPM FLP word, FLP burst, during the DPMDETEN mode, until the detector detects energy from the Link partner 192.

In the preferred embodiment, when the detector detects energy from the Link partner, the detector takes the checks if an FLP word has been received 194. If no FLP is received, then the detector starts and completes parallel detection 196, sets MISMTCH bit to a "1", sets DPMSTAT to "0" 198, and enters link phase as per the parallel detection. The detector then check whether the received FLP matches the DPM FLP.100. If the received FLP word does not match the DPM FLP burst then the detector sets MISMTCH bit to a "1", sets DPMSTAT to "0"198, and completes Auto-Negotiation and enters link phase. If the received FLP word matches the DPM FLP burst then the detector sets DPMSTAT bit to a "1" 202. The detector checks if the DPMCONT bit is set to "1" 204. If DPMCONT bit is a "0" then the system stops Auto-Negotiation 206 and waits for the controller before taking further action. If DPMCONT bit is a "1" then the detector sends a DPM FLP burst 208 and monitors the state of receive FLP timer and energy from the Link partner.

The detector checks whether the Max FLP Receive timer expired 210. If the Receive FLP timer has expired, then the detector sets the DPMSTAT bit to a "0" 212 and starts over the DPM detection.

If the Receive FLP time has not expired, then the detector checks if energy is detected 214. If energy is not detected, then the detector checks if the FLP receive time expired. If energy is detected, then the detector checks whether the FLP has been received 216. If energy is detected from the Link partner but no FLP is received then the sytem starts and completes parallel detection, sets MISMTCH bit to a "1", sets DPMSTAT to "0", and enters link phase as per the parallel detection 196. If an FLP is received, then the detector checks whether the received FLP matches the DPM FLP burst 118. If energy detected from the Link partner is an FLP word and if it matches the DPM FLP burst then the detector returns to sending a DPM FLP burst 108. If energy detected from the Link partner is an FLP word but it does not match the DPM FLP burst then the sytem sets MISMTCH bit to a "1", sets DMPSTAT to "0" 86 and completes Auto-Negotiation and enters link phase.

Table 1 gives a bit summary of the register, 0Fh (15 decimal), in the basic embodiment of the invention. The register, 0Fh (15 decimal), is considered a shadow register, and is referred to as a DPM register. To access the shadow register, the "Spare Control Enable", bit 7, of register 1Fh must be set.

ANRSTRT is Restart. This bit, when set to a "1", restarts the Auto-Negotiation. The detector, after power up, is in a non-DPM detection mode. If DPM detection is needed DPMDETEN bit should be set to a "1" and restart the Auto-Negotiation. Auto-Negotiation can also be restarted by setting bit 9 of reg. 0 (Control Register) to a "1".

TABLE 1

DPM Register summary

| ADDR | NAME | 15-5 | 4 | 3 | 2 | 1 | 0 | DEFAULT |
|---|---|---|---|---|---|---|---|---|
| 0Fh (15d) | DPM | Reserved | LPXTND | MISMTCH | DPMSTAT | ANRSTR | DPMDETEN | 0000h |

Table 2 shows a detailed description of the DPM register bits in the basic embodiment of the invention.

DPMDETEN is DPM detection mode. When this bit is set to a "1", the detector enables DPM detection when Auto-

TABLE 2

DPM REGISTER (ADDRESS 0FH, 15D)

| BIT | NAME | R/W | DESCRIPTION | DEFAULT |
|---|---|---|---|---|
| 15-6 | Reserved | RO | Write as "0", Ignore when read | 0 |
| 5 | DPMWINEN | R/W | 0 | Windowing scheme enable to reduce ip mis-detection probability |
| 4 | LPXTND: Extend Link Pulse width | R/W | 0 = Normal link pulse width (100 ns)<br>1 = Set Link pulse width to 150 ns | 4 |
| 3 | MISMTCH: Word Miss match | RO | 1 = Fast Link Pulse Word miss match occurred during DPM detection | 0 |
| 2 | DPMSTAT: Status | RO | 1 = Link partner is DPM capable | 0 |
| 1 | ANRSRT: Restart | R/W | 1 = Restart Auto-Negotiation (identical to Reg. 0 bit 9) but used for DPM detection | 0 |
| 0 | DPMDETEN: DPM enable | R/W | 1 = Enable DPM detection mode | 0 |

LPXTND is Extend Link Pulse width. When this bit is set to a "1", the system increases the FLP width from a normal 100 ns to 150 ns.

MISMTCH is Word Mismatch. When DPM detection is enabled, the Link partner's FLP word is compared to the unique FLP word sent. MISMTCH bit is set to a "1" if the comparison fails indicating that the Link Partner is not DPM capable. MISMTCH bit is set to "1" for detecting any legacy Ethernet device: either Auto-Negotiation or forced to 10 or 100 Mbits speed.

Negotiation is re-started. Otherwise, the system Auto-Negotiates in a non-DPM detection mode as per the IEEE 802.3u standard. When in DPMDETEN mode, if a legacy Ethernet device is detected through either normal Auto-Negotiation Ability Detect or Parallel Detect paths, the Negotiation process continues to a completion, where link between the two stations is established.

Table 3 shows a detailed description of the MII register, 0Fh (15 decimal), referred to as a DPM register and its bits definition in the preferred embodiment of the invention.

TABLE 3

DPM Register Summary (Address 0Fh, 15d)

| ADDR | NAME | 15-11 | 10-7 | 6 | 5 | 4 | 3 | 2 | 1 | 0 | DEFAULT |
|---|---|---|---|---|---|---|---|---|---|---|---|
| 0Fh (15d) | DPM | FLP-WIDTH | Reserved | DPMCONT | Reserved | LPXTND | MISMTCH | DPMSTAT | ANRSTR | DPMDETEN | 0000h |

DPMSTAT is DPM Status, When DPM detection is enabled, the Link partner's FLP word is compared to the unique FLP word sent. If it matches, the Link Partner is DPM capable and DPMSTAT bit is set to a "1".

Table 4 shows a detailed description of the MII register, 0Fh (15 decimal), referred to as a DPM register and its bits definition.

TABLE 4

DPM Register (Address OFh, 15d)

| BIT | NAME | R/W | DESCRIPTION | DEFAULT |
|---|---|---|---|---|
| 15-11 | FLPWIDTH[4:0] | R/W | FLP width increment register | 0 |
| 10-7 | Reserved | RO | Write as "0", Ignore when read | 0 |
| 6 | DPMCONT | R/W | 0 = Stop after detecting a DPM capable | 0 |
| 5 | Reserved | RO | Write as "0", Ignore when read | 0 |
| 4 | LPXTND: Extend Link Pulse width | R/W | 0 = Normal link pulse width (100 ns) 1 = Set Link pulse width to 150 ns | 0 |
| 3 | MISMTCH: Word mismatch | RO | 1 = Fast Link Pulse Word mismatch occurred during DPM detection indicating that the link partner is a legacy device | 0 |
| 2 | DPMSTAT: Status | RO | 1 = Link partner is DPM capable | 0 |
| 1 | ANRSTRT: Restart | R/W | 1 = Restart Auto-Negotiation (identical to Reg. 0 bit 9) but used for DPM detection | 0 |
| 0 | DPMDETEN: DPM enable | R/W | 1 - Enable DPM detection mode | 0 |

FLPWIDTH [4:0] is the FLP width in DPMDETEN mode. When the detector is in DPMDETEN mode, if LPEXTND is set for a "1" then the FLP pulse width can be changed from a default 100 ns to 150 ns. The width can be further increased to a maximum of 950 ns in 100 ns increments as specified by the FLPWIDTH, a 5 bits register. Although the FLP width can be theoretically increased to 150+31*100=3250 ns, due to TX magnetic characteristics, it is not recommended to increase the FLP width more than 950 ns.

DPMCONT is Continuous DPM Detect Enable. While in DPMDETEN mode if this bit is set to a "1", after initially detecting a DPM capable Link partner, the detector continues to monitor the presence of a DPM capable Link Partner. While in this continuous DPM detection mode, if it detects a non DPM Link partner, the detector establishes a link with the Link partner if possible. FIG. 7 shows the details of the DPM detection procedure combined with Auto-Negotiation.

LPXTND is Extend Link Pulse width. When this bit is set for a "1", the detector increases the link pulse width from a normal 100 ns to 150 ns. Additionally, the link pulse width can be increased to a maximum of 950 ns to 100 ns increments per register FLPWIDTH.

MISMTCH is Word Mismatch. When DPM detection is enabled, the Link partner's FLP word is compared to the unique FLP word sent. MISMTCH bit is set for a "1" if the comparison fails indicating that the Link Partner is not DPM capable.

DPMSTAT is DPM Status. When DPM detection is enabled, the Link partner's FLP word is compared to the unique FLP word sent. If it matches, the Link Partner is DPM capable and DPMSTAT bit is set to a "1".

ANRSTRT is Restart. This bit, when set to a "1", restarts the Auto-Negotiation. The detector, after power up, is in a non-DPM detection mode. If DPM detection is needed DPMDETEN bit should be set to a "1" and restart the Auto-Negotiation. Auto-Negotiation can also be restarted by setting bit 9 of reg. 0 (Control Register) to a "1".

DPMDETEN is DPM detection enable. When this bit is set to a "1", the detector enables DPM detection when Auto-Negotiation is restarted. Otherwise, the detector Auto-Negotiates in a non-DPM detection mode as per the IEEE 802 3u standard.

In addition to DPM detection, the detector is capable of generating interrupts to indicate DPMSTAT bit change if interrupt mode is enabled. The detector has a maskable interrupt bit in the MII register 1Ah. Bit 12, DPMMASK of register 1Ah, when set to a "1" disables generation of DPMSTST change interrupt. Bit 5, DPMINT, of register 1Ah indicates that there has been a change in DPMSTAT bit.

TABLE 5

Interrupt Register (Address 1Ah, 26d)

| ADDRESS | NAME | 15-13 | 12 | 11-6 | 5 | 4-0 | DEFAULT |
|---|---|---|---|---|---|---|---|
| 1Ah | INTERRUPT | Reserved | DPMMASK | Reserved | DPMINT | Reserved | 9F0Xh |

DPMINT is: DPM Interrupt. Bit 5 of MII register 1Ah, a read only bit, if read as a "1", indicates that there has been a DPMSTAT bit change in the DPM detection process. The change indicated could be from a "0" to a "1" or from a "1" to a "0". Additionally, if interrupt has been enabled and DPMMASK is a "0", then the detector generates an interrupt. Reading of register 1Ah clears DPMINT bit and interrupt that was caused by DPMSTAT bit change.

DPMMASK is DPM Mask. When the detector is in DPMDETEN mode, bit 12 of MII register 1Ah, when set to a "1" disables any interrupt generated by the DPMSTAT change if interrupt is enabled. However, bit 5, DPMINT, provides a DPMSTAT change regardless of DPMMASK bit.

The FIG. 7 flowchart shows the sequence for DPM detection combined with Auto-Negotiation in a basic embodiment of the invention. The FIG. 8 flowchart shows the sequence for DPM detection combined with Auto-Negotiation in a preferred embodiment of the invention.

The following items highlight enhancements made in the preferred embodiment of the invention.

Link pulse width. In DPMDETEN mode if LPXTND bit is set to a "1", the FLP width is changed from a normal 100 ns to 150 ns. In addition to this, the detector can increase this width in 100 ns increments, as specified by the FLPWIDTH register. A value of "00000"b (default) in the FLPWIDTH register would be equivalent to the basic embodiment of the invention.

In the basic embodiment of the invention, if MISMTCH bit is set to a "1" while LPXTND bit is a "1", then the link pulse width remains at 150 ns during normal Auto-Negotiation phase. In the preferred embodiment of the invention, the link pulse width is switched back to 100 ns during normal Auto-Negotiation phase.

Continuous DPM detection. The preferred embodiment of the invention incorporates an additional bit DPM-CONT. While in DPMDETEN mode if this bit is set to a "1", after initially detecting a DPM capable Link partner, the detector continues to monitor the presence of a DPM capable Link partner. While in this continuous DPM detection mode, if it detects a non-DPM Link partner, the detector establishes a Link partner if possible. FIG. 8 shows the details. In the preferred embodiment, the DPM detection function is identical to the basic embodiment if DPMCONT bit is a "0" (default).

Interrupt. The preferred embodiment provides a maskable interrupt for the DPMSTAT bit change. This is enabled by setting DPMMASK, bit 12 of MII register 1Ah, to a "0" if the detector's interrupt bit 14 of MII register 1Ah is set for a "1". In the preferred embodiment, if DPMMASK is set to a "1" (default) then the detector does not provide DPMSTAT bit change interrupt as is the case in the basic embodiment.

DPM Detection Operation

The DPM detection process prevents the detector from supplying power to a legacy DTE not equipped to handle power through the MDI. In case the far-end device is not a DTE requiring power, the far-end unit's link detection is unaffected by the DPM detection mechanism. The standard Auto-Negotiation process occurs in parallel to the DPM detection process, enabling detection of non-DTE requiring power devices while DPM detection is enabled. Randomization in the DPM detection algorithm prevents two detection-enabled stations from simultaneously applying power. The DPM detection scheme works over CAT-3, CAT-5, or better cabling The detector is set to a mode to search for a DTE requiring power. The DTE requiring power's RD pair is effectively connected to the TD pair through a low pass filter. The detector of the detecting station transmits a random code of sufficient uniqueness. The DTE requiring power is detected through the detector of the detecting station receiving its unique random code through the DTE requiring power loopback. Once the detecting station detects the presence of the DTE requiring power, it supplies detector power to the DTE requiring power via an MDI connection. The detecting station then performs an Auto-Negotiation with the now-powered DTE requiring power. During the detection process, if the detecting station receives valid 10Base-T NLPs, 100Base-TX idles, or Auto-Negotiation FLP code-words, it Auto-Negotiates normally.

To prevent a legacy link partner from saturating the detector's port with valid packets when connected to a DTE requiring power without power (DTE requiring power loopback condition), the DTE requiring power receive pair (RD) is effectively connected to its transmit pair (TD) through a low pass filter. This low pass filter cuts-off the legacy link partner's valid data, avoiding network activity. The random code signal used for DTE requiring power detection must be of sufficiently low frequency content to pass through the filter, as well as two worst-case CAT-3 cables. Once the DTE requiring power is applied, the DTE requiring power loopback condition and low pass filter connection are removed and the RD and TD pairs operate normally Following reset, the DPM Detection Mode (DPMDETEN) is disabled and normal, IEEE Standard, Auto-Negotiation process begins. To enable the DPMDETEN mode, firmware must set the DPM Detection Enable bit, DPMDETEN (DPMFON reg, bit 0) to a '1', and then set the Auto-Negotiation Restart bit, ANRSTRT (DPM reg, bit 1) to a '1'.

When in the DPMDETEN mode, setting the ANRSTRT bit causes a random sequence to be loaded into the Auto-Negotiation Advertisement Transmit register, and the first FLP word transmitted contains this sequence. While this sequence is transmitted, the link pulses are extended to 1.5 times normal pulse width.

While in the DPMDETEN mode, as long as nothing is received from a link partner, the device continues to transmit the above FLP word. Once a link partner FLP burst is received, if it does not match the FLP word from the device, then the link partner is not DPM capable. In this case, the device sets the DPM Mismatched bit, MISMTCH, (DPM reg, bit 3) to a '1'.

If the link partner FLP burst received matches the FLP word the device transmitted, it indicates that the device at the other end is a DPM and its relay is closed to loopback the devices transmit data to its receive port. In this case, the device sets the DPM Status bit, DPMSTAT, (DPM reg, bit 2).

In either case of detecting a DPM or a normal link partner, the device stops the Auto-Negotiation process and waits in the TX-Disable state of the Auto-Negotiation Arbitrator State Machine. The firmware must take the necessary actions, e.g. power up the DPM, and then in either case, disable the DPMDETEN bit and Restart Auto-Negotiation to establish link with the partner.

The DPM register contains both the DPMSTAT and MISMTCH bits. Therefore, polling this register alone provides the necessary status information to indicate either a DPM or a normal link partner.

Firmware and DPM Detection Handshake

The detector is in normal Auto-Negotiation mode upon startup. The Firmware enables the DPMDETEN mode (DPMDETEN bit) and sets the ANRSTRT bit. The detector sends out the DPM random sequence FLP word. While searching for a DPM, if the received FLP burst matches what the detector transmitted, then the remote partner is a DPM. The DPMSTAT bit is set and the Auto-Negotiation process is stopped.

On the other hand, while searching for a DPM, if a mismatch between the transmitted and received FLP words occurs, then the remote device is not a DPM. The MISMTCH bit is set and the Auto-Negotiation process is stopped.

The firmware monitors the DPMSTAT and MISMTCH bits. Once either of these mutually exclusive status bit is set, the firmware clears the DPMDETEN bit and sets the ANRSTRT bit to complete the normal Auto-Negotiation process in order to link up with either the remote DPM or normal link partner.

DPM Mis-Detection Probability

It is possible that the device at the other end also attempts to search of an DPM device using the same DPM Phone Detection procedure. If the link partner is another embodiment of the invention (another system detector), then the chances of both devices sending out an identical FLP word is 1 in $2^{14}$.

To further reduce the mis-detection probability, the detector includes a time windowing scheme. If a matching FLP burst is received within the maximum time allowed for the FLP burst to make a round trip back to its receive port, the DPMSTAT bit is set. In the preferred embodiment, this maximum time is set to 16 us, which is more than the actual maximum round trip time for the longest cable length. The maximum time is programable. Since a device can send out an FLP burst at any time within a 16 ms window, the probability of it sending out the FLP burst in any 16 us span is 1 in 1000. Therefore, the mis-detection probability is 1 in ($2^{14}$ multiplied by 1000), or 1 in 16 million events.

When mis-detection does happen, one or both devices erroneously sets the IPSTAT bit. It's then up to the firmware to monitor this mis-detection event and take the appropriate actions.

Although a preferred embodiment of the present invention has been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A detecting station having an output and a return coupled to a two-way transmission line, comprising:
    a word generator operable to generate a test word that is transniitted on the detection station output;
    a comparator to compare the detecting station output with the detecting station return; and
    a controller operable to determine whether a device requiring power is coupled to the transmission line based on the comparison;
    wherein the test word comprises an address of the controller.

2. The detecting station of claim 1 wherein the word generator comprises a free running timer.

3. The detecting station of claim 1 further comprising a pulse shaping device coupled between the word generator and the detecting station output.

4. The detecting station of claim 3 wherein the pulse shaping device is progranirnaNe by the controller.

5. A detector having an output and a return coupled to a two-way transmission line, comprising:
    a word generator operable to generate a test word that is transmitted on the detector output;
    a register coupled between the word generator and the detector output and operable to latch a word generator output in response to a trigger;
    a timer enabled by the trigger for a predetermined time thereafter;
    a comparator operable to compare the detector output with the detector return, the comparator being enabled only while the timer is enabled; and
    a controller operable to determine whether a device requiring power is coupled to the transmission line based on the comparison.

6. The detector of claim 5 wherein the word generator comprises a free running timer.

7. The detector of claim 5 further comprising a pulse shaping device coupled between the word generator and the detector output.

8. The detector of claim 7 wherein the pulse shaping device is programmable.

9. The detector of claim 8 wherein the pulse shaping device is programmed to output a first pulse having a first pulse width and a second pulse having a second pulse width different from the first pulse width.

* * * * *